(12) United States Patent
Loporto et al.

(10) Patent No.: US 8,519,832 B2
(45) Date of Patent: Aug. 27, 2013

(54) INTELLIGENT POWER SYSTEM AND METHODS FOR ITS APPLICATION

(75) Inventors: John J. Loporto, Superior, CO (US); Stan McClellan, Allen, TX (US)

(73) Assignee: Power Tagging Technologies, Inc., Boulder, CO (US)

( * ) Notice: Subject to any disclaimer, the term of this patent is extended or adjusted under 35 U.S.C. 154(b) by 1023 days.

(21) Appl. No.: 12/480,493

(22) Filed: Jun. 8, 2009

(65) Prior Publication Data

US 2009/0304101 A1 Dec. 10, 2009

Related U.S. Application Data

(60) Provisional application No. 61/059,621, filed on Jun. 6, 2008.

(51) Int. Cl.
*G08C 19/16* (2006.01)

(52) U.S. Cl.
USPC ... 340/12.32; 340/7.32; 340/7.37; 340/12.31; 340/13.23; 340/333; 370/204; 370/318; 370/464; 370/535; 370/536

(58) Field of Classification Search
USPC .............. 340/7.32, 7.37, 12.32, 13.23, 539.3, 340/639.2, 639.3, 568.2, 332, 425.2, 855.8, 340/333, 538–538.17; 429/13; 320/101, 320/104, 109, 113, 115; 705/26.1–27.2, 705/39, 50–54, 64–69, 77–79, 400, 412; 307/66, 80; 380/227–230; 702/16–25, 61–62; 700/286, 297; 455/70, 39, 68; 370/318, 370/535, 536; 375/260
See application file for complete search history.

(56) References Cited

U.S. PATENT DOCUMENTS

2004/0110044 A1 * 6/2004 McArthur et al. .............. 429/13
2004/0227621 A1 11/2004 Cope et al.

OTHER PUBLICATIONS

Cuthbert Nyack, "Convolution and Autocorrelaction," http://cnyack.homestead.com/files/aconv/convau1.ht, Web. Jun. 7, 2009.
Dermot Collins et al., "Transmission on Power Line Cables," Telektronikk 2/3, (1999).
Chong Hock K. Goh, "A Current Study of Automatic Meter Reading Solutions via Power Line Communications," http://wpweb2k.gsia.cmu.edu/ceic/publicatons.htm. (Published 2003 or later as evidenced by the bibliography).
K.B. Ha, "Power Line Communication Technology," Presentation at Hong Kong Institute of Engineers Seminar on Last Mile Technology, (Jun. 20, 2003).
Olaf G. Hooijen, "A Channel Model for the Residential Power Circuit Used as a Digital Communications Medium," IEEE Transactions on Electromagnetic Compatiblity, 40(4): pp. 331-336 , (Nov. 1998).

(Continued)

*Primary Examiner* — Steven Lim
*Assistant Examiner* — Sisay Yacob
(74) *Attorney, Agent, or Firm* — Hogan Lovells US LLP

(57) ABSTRACT

Methods and systems for injecting information into a power signal, and techniques to capture the injected information are disclosed. Various processes for using the information are also presented, which may relate to the type of device receiving the information. Moreover, techniques for determining the distance of a consumer device are disclosed, as have a specific implementation which relates to mobile consumer devices. Also various ways of encrypting both in-band and out-of-band transmission are disclosed.

33 Claims, 10 Drawing Sheets

(56) References Cited

OTHER PUBLICATIONS

Luis F. Montoya, "Power Line Communications Performance Overview of the Physical Layer of Available Protocols," Thesis of Research, University of Florida, Gainesville, Florida, pp. 1-15 (publication date unknown).

J.E. Newbury, "Efficient Communication Services Using the Low Voltage Distribution Line," Proceedings of 2002 PES Winter Meeting, pp. 579-591, (2002).

Niovi Pavlidou, et al., "Power Line Communications: State of the Art and Future Trends," IEEE Communications Magazne, 41(4): pp. 34-40, (Apr. 2003).

Gerald Schickhuber and Oliver Mccarthy, "Control Using Power Lines—A European View," Computing & Control Engineering Journal, 8(4): pp. 180-184, (Aug. 1997).

Petrus A. Hanse Van Rensburg and Hendrik C. Ferreira, "Design of a Bidirectional Impedance-Adapting Transformer Coupling Circuit for Low-Voltage Power-Line Communications," IEEE Transactions on Power Delivery, 20 (1): pp. 64-70, (Jan. 2005).

Universal Powerline Bus Communication Technology Overview, (Jan. 8, 2002), http://pulseworx.com/downloads/upb/UpbOverview.pdf.

X-10 (U.S.A.) Inc., X-10.RTM. Powerhouse (TM) Technical Note, "The X-10 Powerhouse Power Line Interface Model #PL513 and Two-Way Power Line Interface Model #TW523", 12 pages, Revision 2.4, Dave Rye, (1991).

Moreno-Munoz A., et al., "Integrating Power Quality to Automated Meter Reading", IEEE Industrial Electronics Magazine, IEEE, US, vol. 2, No. 2, Jun. 1, 2008, pp. 10-18.

Moonsuk Choi, et al., "Design of Integrated Meter Reading System based on Power-Line Communication", Power Line Communications and Its Applications, IEEE, International Symposium, Apr. 2, 2008, pp. 280-284.

Paola Bresesti, et al., "SDNO: Smart Distribution Network Operation Project", Power Engineering Society General Meeting, IEEE, Jun. 1, 2007, pp. 1-4.

International Search Report dated Mar. 2, 2010, PCT/US2009/046644.

\* cited by examiner

INTELLIGENT POWER SYSTEM AND METHODS FOR ITS APPLICATION

FIELD OF THE INVENTION

Aspects of the present invention relate to providing an intelligent system for distributing power to consumer devices. More specifically, the invention contemplates sending information concerning sending information in-band and out-of band.

BACKGROUND OF THE INVENTION

Typical power systems simply distribute power by generating power and allowing the power to flow from a location having a high voltage to an area of low voltage. While power sources may monitor the consumption of energy, they do not generally know any information about the device which consume the energy. Similarly, while the consumer devices can determine whether they are receiving power, they do not generally from what source they are receiving power. Aspects of the present invention overcome this and other problems.

SUMMARY OF THE INVENTION

In a first configuration of the present invention, a system is provided for distributing power. The system may contain a power source, a power transceiver, a consumer device, and a server. These four components, may comprise a number of subcomponents to allow the system to provide improved control, regulation, and utility to various connected components. Certain aspects of the present invention may provide a process for controlling a consumer device based upon information relating to characteristics (such as green power) of the power source. Also, various methods of injecting or embedding a signature into a power signal are presented, including generating a baseband carrier wave to distribute power and the information to a consumer device.

To make use of the embedded or encoded information, processes for decoding a signature from a combined power signal are disclosed. To assist in restricting unauthorized access to information relating to the consumer device, processes for encrypting out-of-band communications are disclosed. In addition, a process performed by the power source relating to using information from a consumer device's identifier for security, outages and damaged power lines, or adjusting capacity is disclosed.

Processes for embedding a signature into a power signal using OFDM are also disclosed. Some of these processes may use specific modulation techniques such as PSK to encode the signature into the power signal. Also, various processes for balancing bandwidth considerations and dimensionality concerns are disclosed, as are techniques for adding error code checking. In addition to embedding a signal using OFDM, a process for embedding a signature into a power signal using CDMA is disclosed.

Also various processes for measuring channel length are disclosed, as are processes for tracking a consumer device's power consumption. In addition, a process for determining whether to draw or transmit energy to and from a consumer device is provided.

The process for controlling a consumer device based upon information relating to characteristics of the power source may include sending a power signal to a power transceiver; embedding a signature into the power signal using a modulator to form a combined signal; transmitting the combined power signal to a consumer device; transmitting the signature and additional information to a server having records; storing the signature and the additional information in the records; demodulating the combined signal to determine the signature; sending the power from the power signal to a power supply coupled to the consumer device; generating a query based on the signature; sending the query to the server to request the server to lookup information in the records, by utilizing the signature as a primary key from which to request the additional information; or responding to the query by sending the additional information to the consumer device. The process may also include turning off the power supply if the information from the server indicates the power cost of power exceeds a predefined value; setting the consumer device to run in a power saving mode if the information from the server indicates the power exceeds a predefined value; turning on the power supply if the information from the server indicates the power is less than a predefined value; sending battery characteristics, user charge/discharge preferences, and vehicle-specific information to the consumer device; sending time-of-day restrictions and power cost information; or monitoring the characteristics of the power source to determine how much of the power comes from green sources, and instructing the controller to switch off or move certain electrical devices into a reduced power level if a certain percentage of the power does not come from green sources.

The process for embedding a signature into a power signal using OFDM may include: generating the signature; receiving a power signal having harmonics for transmitting power to a consumer device and for transmitting the signature to the consumer device; demultiplexing the signature into several sub-sequences; modulating the sub-sequences onto one or more carriers near the power signal using a modulator; wherein the step of modulating utilizes OFDM to embed the information into the carriers near the power signal. The power signal may comprise locations of peak and nonpeak spectral magnitude, and the step of modulating may add the sub-sequences to the carriers in the location of nonpeak magnitude. Additionally, the modulator may be instructed to use instantaneous phase or amplitude discontinuities to produce sub-channel modulation and improve carrier error rate in the power channel; the step of modulating uses minimum shift keying (MSK), binary PSK (BPSK), quadrature-carrier PSK (QPSK), or differential PSK (D-PSK) to produce the sub-channel modulation; the step of modulating may use frequency modulation to produce the sub-channel modulation; the step of modulating may use Amplitude Shift Keying (ASK) to produce the sub-channel modulation. In some embodiments, the embedded information may have a spectral containment of at least 90%; the embedded information may be embedded at a bandwidth of 5 Hz, 10 Hz, or 20 Hz; the embedded information can transfer information at 0.5 bits/Hz and 2.5 bits per second if the modulator is instructed to use binary phase shift keying at a bandwidth of 5 Hz; the embedded information can transfer information at 1.0 bits/Hz and 20 bits per second if the modulator is instructed to use quadrature carrier phase shift keying at a bandwidth of 20 Hz; the modulator may place the sub-channels near the $12^{th}$, $14^{th}$, and $16^{th}$ harmonics of the power signal; the modulator may utilize forward error correction coding to provide the signature with error protection; the error correction coding may be coded OFDM; the error correction coding may employ a convolutional code; the error correction coding may employ a concatenated Reed-Solomon code and time/frequency interleaving; or the error correction coding may be turbo coding or low-density parity-checking.

The process for tracking a consumer device's power consumption from a power source may include the steps of:

providing a server having a memory for storing an account having a user's payment information and consumer device information; connecting the consumer device to a power outlet to allow power to flow from the power source to the consumer device; sending an in-band transmission to the power source to charge the account associated with the consumer device for the consumption of the power; wherein the step of sending includes: generating a signature for identifying the consumer device: wherein the signature comprises a code, and the code is stored on a VIM; demultiplexing the signature into a plurality of subsequences; and modulating the subsequences into the in-band transmission. Additionally, the steps of demodulating the in-band transmission to determine the signature at the power source; querying the server to determine whether an account associated with the consumer device exists; sending a response concerning the query to the power source may performed. If the response indicates an account associated with the consumer device is present: the steps of monitoring the flow of the power from the power source to the consumer device; detecting when the consumer device ceases drawing power; sending a total amount of energy consumed to the server; determining how much to charge the account for the energy consumed; transmitting the total charge for the energy and a total amount energy which was consumed by the consumer device; or displaying the total charge and energy consumed with a component of the consumer device may be performed. If the response does not indicate an account associated with the consumer device is present, the step of transmitting a message to the consumer device to cause the consumer device to display information to indicate that the consumer device is not associated with an account may be performed. Additionally, the step of transmitting a price for the energy to the consumer device once the identity of the consumer device has been determined; wherein the consumer device is a vehicle or more specifically an electric or hybrid automobile may be performed.

Embodiments of the present invention may include a consumer device having a controller and a power supply having a charge. The controller may comprise instructions stored on computer readable memory to cause the consumer device to execute the steps of: establishing a maximum cost per watt of energy, and a minimum cost per watt of energy; drawing power from a power source if the cost of the power is less than the maximum cost per watt, and the charge on the power supply is less than a predefined percentage; sending power to the power source if the power source is offering more than the minimum cost per watt, and the charge on the power supply is greater than a predefined percentage; wherein the consumer device is an electric or hybrid automobile.

BRIEF DESCRIPTION OF THE FIGURES

FIG. 1: is a schematic view of an embodiment of the invention illustrating a system having a power source, power transceiver, consumer device, and a server.

DETAILED DESCRIPTION OF THE INVENTION

Figure 1:
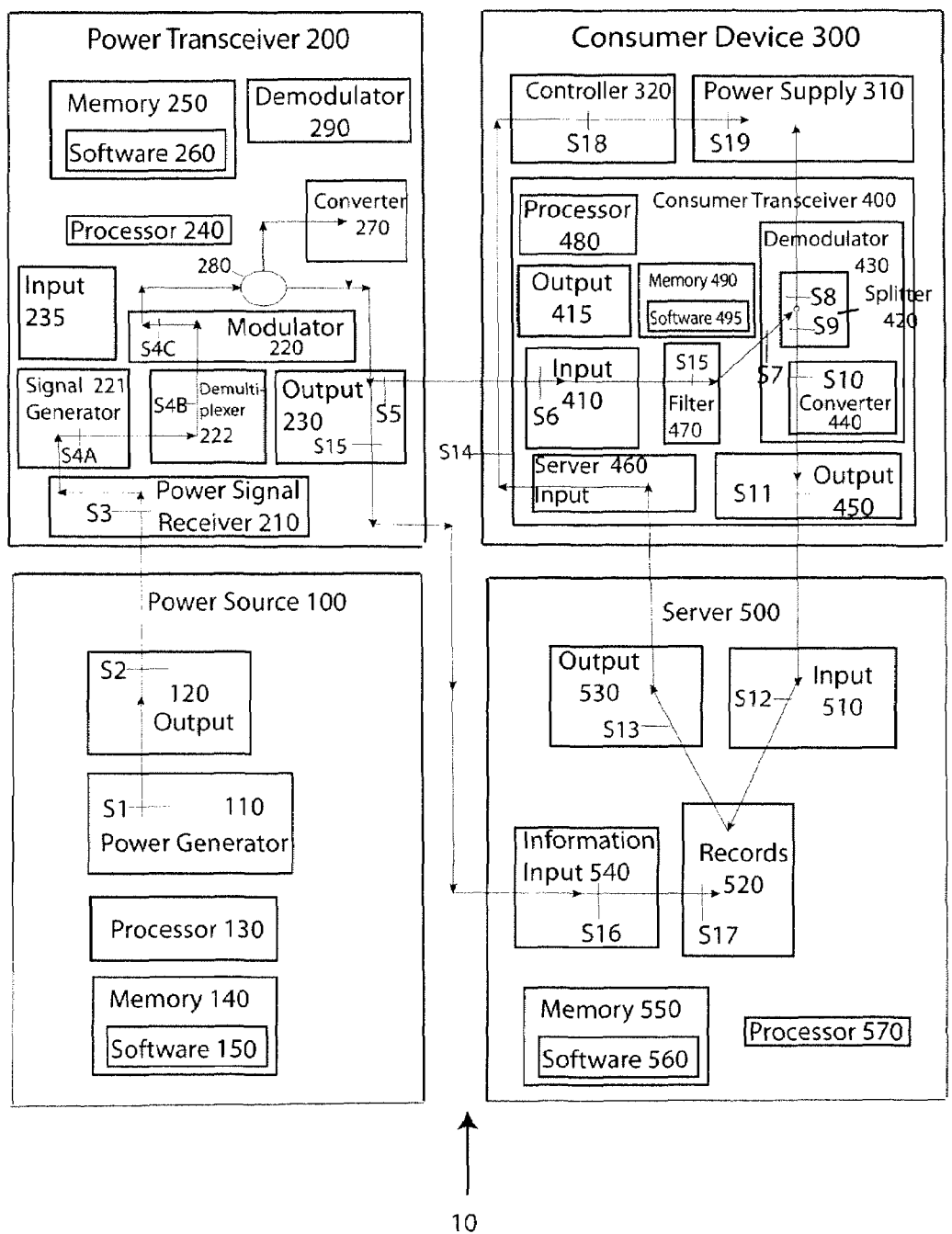
FIG. 1.

Aspects of the present invention provide a system 10 for intelligent power distribution. FIG. 1 illustrates a schematic view of an embodiment of the present invention comprising four components: a power source 100, a power transceiver 200, a consumer device 300, and a server 500. Various embodiments of the present invention may comprise a plurality of any of these components, and embodiments may be built without one more or of these components.

Figure 2A:
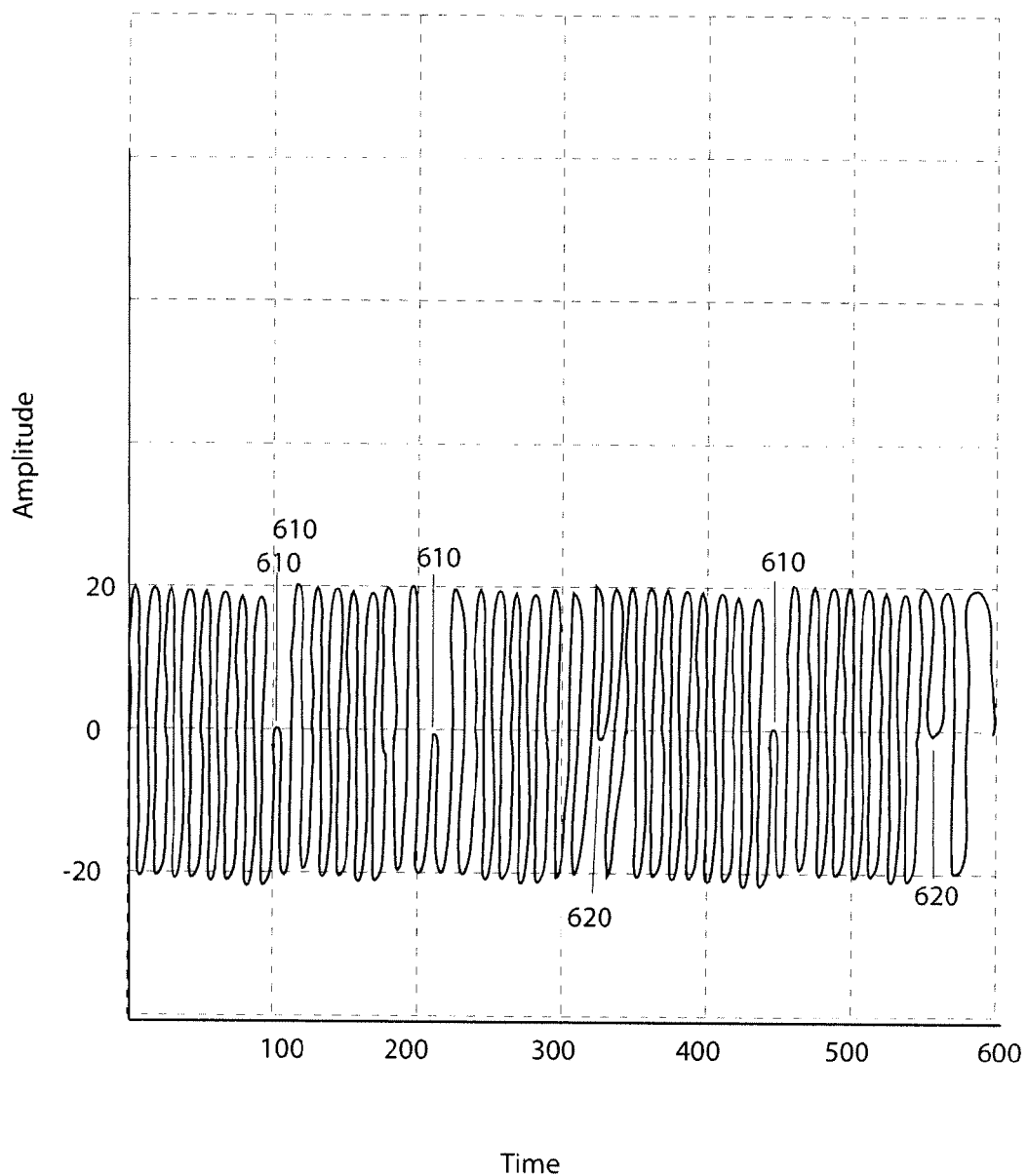
FIG. 2A: is a graph of a PSK modulated signature to be injected into a power waveform, wherein the amplitude of the modulated signature waveform is plotted against time.
Figure 2B:
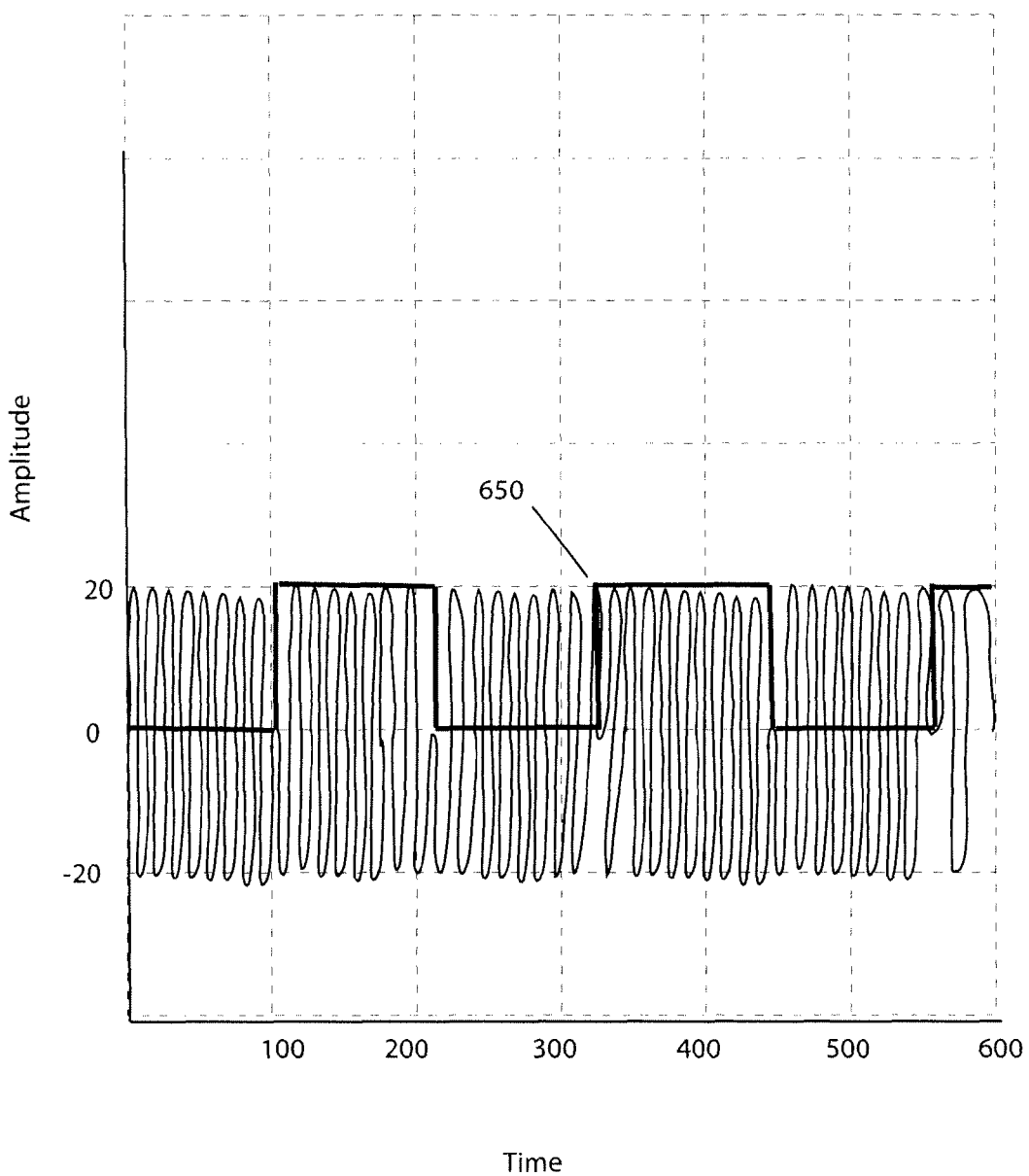
FIG. 2B: is similar to the graph of FIG. 2A, except a plot of the signature is also shown.
Figure 2C:
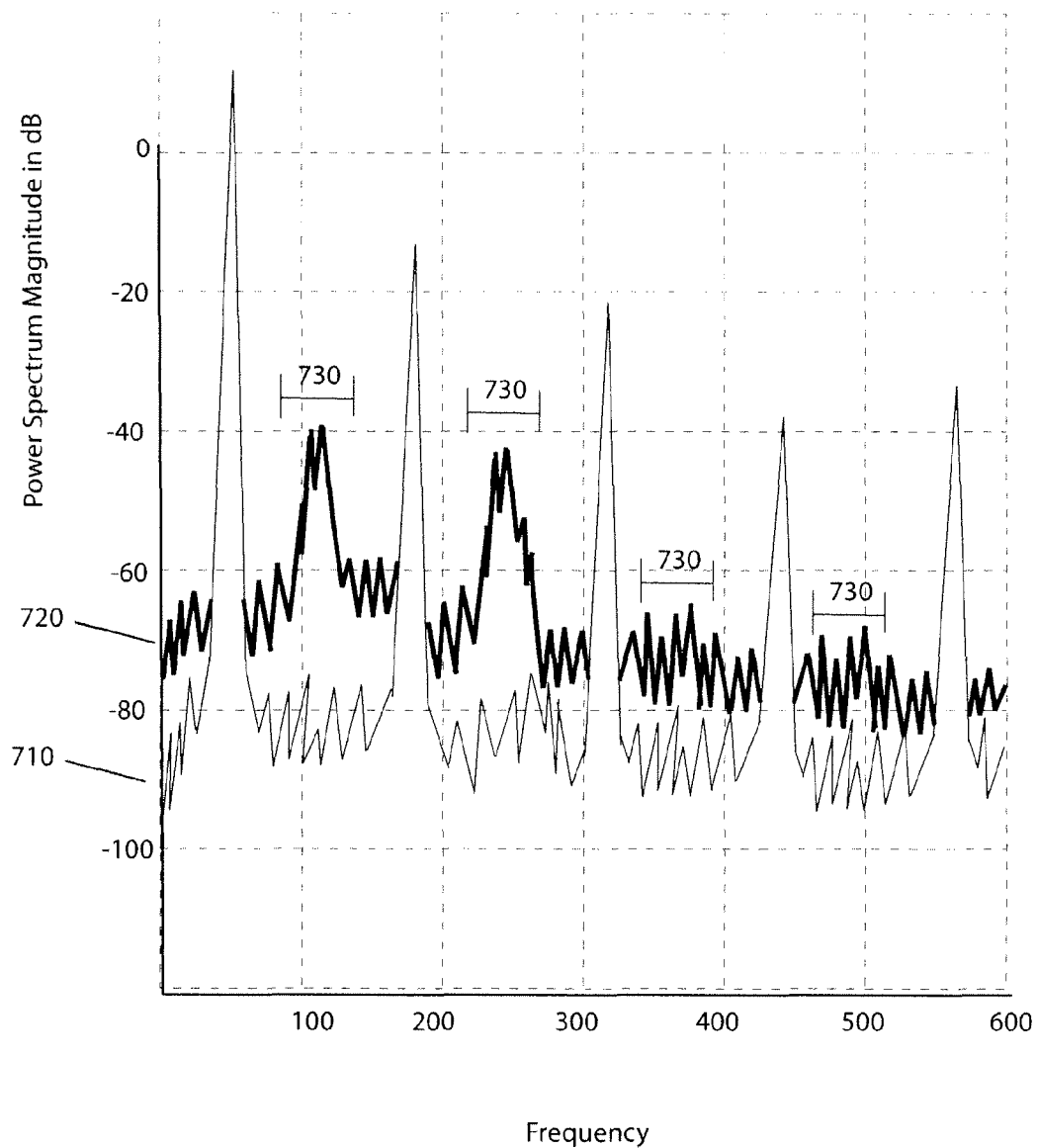
FIG. 2C: is a graph of a PSK modulated signature injected into a power waveform, wherein the magnitude of the power signal and the combined signal are plotted against frequency.

Power source 100 may be a large power generation facility such as the Hoover Dam, a local power facility such LILCO, PECO, or ConEdison, or a power generator such as the power generators made by Honeywell, Briggs and Stratton, or Generac. The power source 100 may also comprise a power generator 110 for generating a power signal 710 (FIG. 2C). The power signal may be transmitted to the power transceiver 200 via output 120, The power generator 100 may comprise the power transceiver 200 or they may be separate components as shown. The power transceiver 200 may comprise a signal generator 221 for creating (S4A) a single, original stream of discrete data which can be called a "digital signature". A demultiplexer 222 may demultiplex (S4B) the signal into several sub-sequences. (Multiplexing is the combining of several distinct sequences into a single composite sequence. Demultiplexing is the inversion of the multiplexing process, and can also be performed on a single distinct sequence to produce several sub-sequences). A modulator 220 may modulate the original sequence or the sub-sequences (S4C) onto a carrier waveform in one or more subchannels. (Modulating is the representation of a sequence of discrete "symbols" by an analog waveform. This representation is often created by using changes in the discrete sequence to create specific, synchronized changes in the amplitude, frequency, or phase of one or more sinusoidal waveforms. In some cases, the "symbols" are individual data bits. In other cases, the "symbols" are groups of data bits). The power transceiver may comprise a processor 240 and memory 250 with software 260 for causing a modulator 220 to perform a variety of modifications to power signal 710. The modulator may also comprise a power signal receiver 210 for receiving (S3) the power signal, and an output 230 for sending a combined power signal to the consumer device 300.

Power transceiver 200 may be used to add a signature (650, FIG. 2B) to the power signal (710, FIG. 2C) to generate a combined waveform. To do this, the power transceiver 200 will instruct (S4A) signal generator 221 to generate a signature 650. Demultiplexor 222 may split (S4B) the signature into multiple sub-sequences to form a demultiplexed signature. Modulator 220 adds (S4C) the signature, possibly in several sub-channels according to the demultiplexing process, to power waveform 710. Later, demodulator 430 will be able to discern the secondary, modulated waveform and corresponding signature from the original power waveform, in part, because the original power waveform is "concentrated" around 60 Hz, and the secondary waveform is "concentrated" around some other frequencies. The power transceiver may also comprise an input 215 for receiving information from the consumer transceiver 300 or the server 500.

The consumer device is a device which draws electricity into its power supply 310 (such as a washing machine, lamp, or air conditioner) in order to perform some function. The system 10 may also comprise a generator or battery. In such a system, power may flow from the generator back to power source 100. Additionally, the system 10 may also may be a hybrid vehicle and power may flow from the battery of the hybrid device to the power source 100, and from the power source 100 to the battery of the hybrid device. The controller 320 of the consumer device 300 may comprise a memory with instructions in the memory for causing the consumer device to execute a number of different functions (which are explained In the embodiment shown in the FIG. 1, the consumer transceiver 400 is shown having an input 410 for receiving a power signal from the power transceiver 200. A band pass filter 470 may be included to allow the consumer device to select a portion of the power signal between certain frequency ranges. Splitter 420 may be used to send the power from the power signal to the power supply 310 of the consumer device 300 and send information to the server 500. The consumer transceiver 400 may comprise a demodulator 430 for determining the signature 650 from the power signal 710. The demodulator 430 may comprise an analog to digital converter for converting the received, demodulated analog signature into a digital signature. The processor 480 may execute software stored in the memory 490 of the consumer transceiver to control the operation of the components of the consumer transceiver. For example, the processor may instruct the output 450 to send an out-of-band transmission to the server 500. The processor may also control communications between the consumer device 300 and the consumer transceiver 400. For example, the processor can instruct the server input 460 to send information received from the server 500 to the controller 320 of the consumer device 300. The consumer transceiver may also comprise an output 415 for receiving information from the consumer transceiver 300 or the server 500.

The server 500 may have a processor, memory, and software for accessing, analyzing, and delivering information to the other components of the system 10. For example, the processor 560 may control input 510, information input 540, and output 530 which transmit information to and from the server. The processor 570 may execute software routines stored in the memory 550 which allow the processor 570 to look up information in the records 520 of the server 500.

In a first configuration of the invention, the power source 100 may use a power generator 110 to generate (S1) a power signal which may be transmitted (S2) to the power transceiver 200 through the output 120. The power transceiver 200 may receive (S3) the power signal using the power signal receiver 210, embed or inject (S4C) information in the power signal using the modulator 220, and transmit the combined power signal (S5) to the consumer device 300 using the output 230. The output 230 may also send (S15) information, such as signature, origin of the power, how the power was generated (coal, oil, wind, etc), cost of the power, etc) to the information input 540 of the server 500. The server 500 may store the information and the signature in its records 520. In some embodiments, the server 500 may store (S17) the information in a database, wherein the signature serves as a primary key from which a query can be generated to obtain the additional information about the signature. Returning to step (S5), the consumer device 300 may comprise a consumer transceiver 400 which can process information embedded in the power signal, and receive (S6) the power signal from power transceiver 200 with an input 410. The input 410 may transmit the power signal into a demodulator 430 which determines (S7) the signature, and optionally using a splitter 420, send (S8) the power signal to the power supply 310 of the consumer device 300, and send (S9) the signature to the output 450 which may send (S11) the signature to the input 510 of the server 500. The output 450 may also send a query to the server 500 to request the server to lookup (S12) information in the server's records 520 about the signature, and return (S13) information about the signature back to the consumer device 300. The server 500 may use an output 530 to transmit (S13) information to a server input 460 of the consumer device 300. The server input 460 may capture the information from the server 500, and send (S14) the information to the consumer device controller 320. The device controller 320 may perform (S18) a variety of functions depending on the information received. For example, the controller 320 may turn off (S19) the power supply if the information from the server indicates the costs for the power is greater than 10 cents per kilowatt. Similarly, the consumer device 300 may autonomously perform (S18) a variety of functions depending on the information received (S7) and demodulated (S8, S9), if the consumer device 300 is suitably configured. For example, the signature transmission (S5) may include information about the instantaneous price of electricity, or about current conditions on the local power grid. If the controller 320 and software 495 of the consumer device 300 have been pre-configured to decode and respond to these items of information (S8, S9), then the consumer device 300 may perform one or many such functions in accordance with the pre-configured instructions. Such actions may include completely disconnecting the consumer device 300 from the power grid, setting the consumer device to run in a power saving mode if the information from the server indicates the power exceeds a predefined value; causing the consumer device 300 to accept additional power from the grid through input 410, or causing the consumer device 300 to provide power to the grid through input 410 from its local power reservoir.

The information sent by the server 500 may depend on the type of the consumer device 300 connected to the transceiver 400. For example, if the device is a hybrid motor vehicle this information may include battery characteristics, user charge/discharge preferences, or other subscriber-specific, vehicle-specific, or network-specific information which is important for the present transaction. The server 500 may send this information to consumer device to allow the consumer device to check or reconcile that the information in the server 500 which relates to the characteristics of the consumer device 300 are correct. In some configurations, the consumer device 300 will return it's own copy of this information to the server 500 to allow the server 500 to update its records 520. If the device 300 is a washing machine or an air conditioner or another type of device which presents a load to the power network, this information may include time-of-day restrictions, electricity cost information, or other subscriber-specific or network-specific information which is important for the present transaction. If the device is an electric generator or wind turbine or solar panel which can create energy to be released into the electric power network, this information may include time-of-day restrictions, electricity cost or pricing information, or other subscriber-specific or network-specific information which is important for the present transaction. Moreover, the consumer device 300 may use the information to change the way the consumer device 300 functions based on the received information. For example, if the information sent to the consumer device 300 indicates that the cost of the electricity is greater than a predetermined value, the controller 320 may instruct the device 300 to enter into a power saving mode. In another example, a company (which represents the load on the system 10) may wish to publicize its commitment to green or renewable energy sources (which may be more expensive.) In such a case, the company may monitor the source of the power to determine how much of its power comes from green sources. Controller 320 may be programmed to switch off or move certain electrical devices into a reduced power level if a certain percentage of its power does not come from green sources. The company may also use this information to validate or enforce a service contract with the power source which requires a certain instantaneous or average percentage of power from green sources.

One of functions of the power transceiver 200 may be to embed or inject a signature 650 into the power signal 710. A signature 650 is an identifiable aspect of a power signal 710, and may be expressed in a digital or analog form. It may be a randomly generated number (based on a seed value or an aspect of the power signal) or specifically generated via an enumeration algorithm. Once this "digital" signature is created or known, it can be modulated to create an analog signature waveform which is then added to the power signal. In some configurations, the digital signature may be comprised of several measured quantities from several different observable and related signals which, when considered together, may represent the complete signature. The signature may be visualized as a set of discrete quantities and/or analog signals that, when considered together, represent an analog or a digital signal which identify the generator of the power waveform. For example, FIG. 2A shows a phase shifted waveform (i.e. a modulated signature signal) plotted in amplitude versus time. The point at which the wave only reaches an amplitude of about zero (610), corresponds to a bit of data which the demodulator 430 can determine. In this example, a zero is encoded at points (610) and ones are encoded at points (620). The signature (650) is shown as a dark line in FIG. 2B. Thus the encoded signature of the waveform of FIG. 2A is 00101. FIG. 2C shows the frequency spectrum of an initial waveform of a power signal 710 which may be transmitted from the power source 100 to the consumer device 300. When the power transceiver 200 is used to embed the signature into the power signal 710, a combined waveform is created, whose frequency spectrum is shown as 720. Aspects of the present invention contemplate various injection processes the power transceiver 200 may perform to embed the signature into the power signal 710 including a OFDM process and a CDMA process which are explained in more detail later in the application (see paragraphs [0037]-[0048] for OFDM and [0050]-[0053] for CDMA). Additionally, a noninjection-based process is contemplated and explained below.

Figure 3:
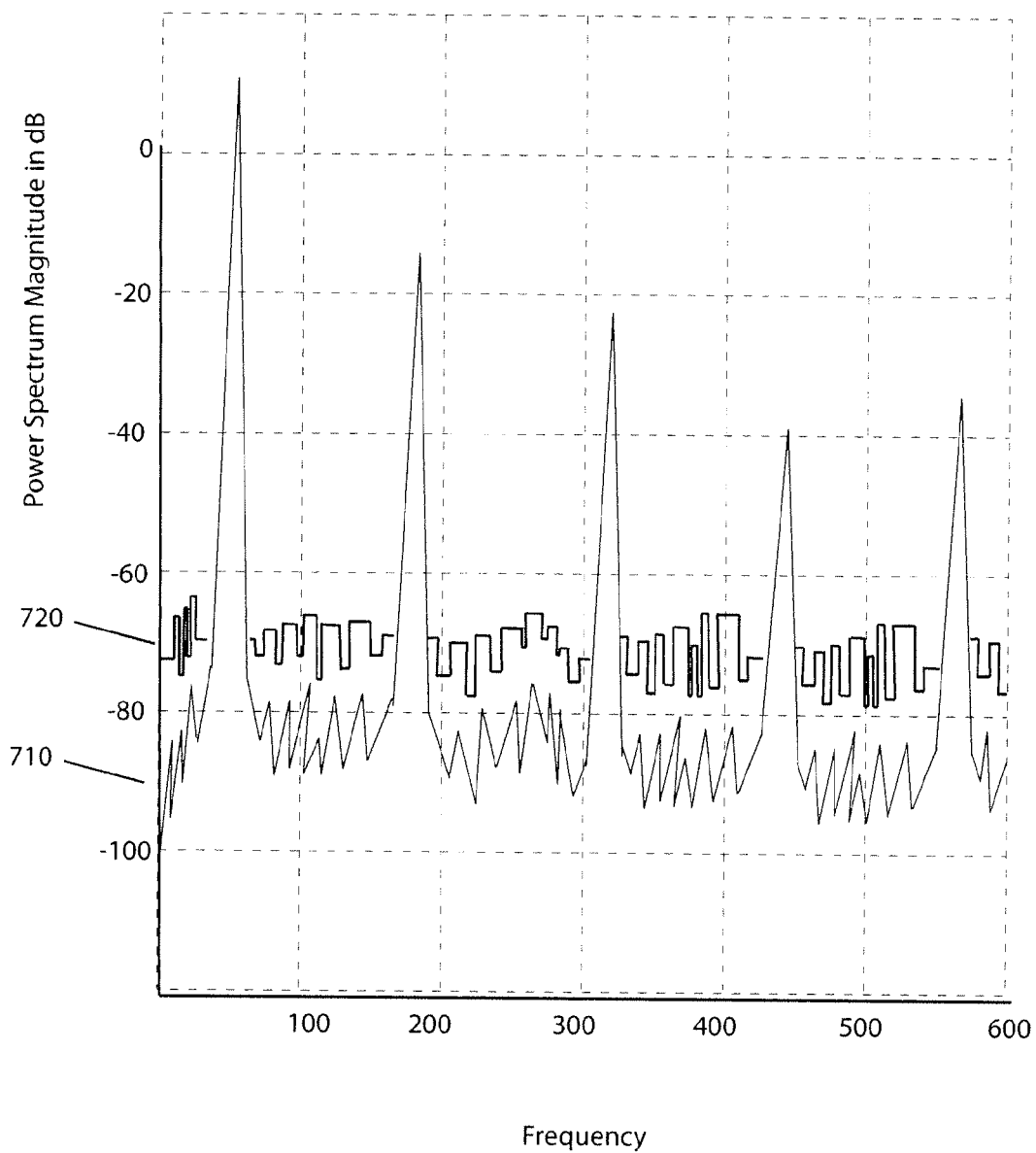
FIG. 3: is a graph of a second embodiment of a baseband version of the power signal and the combined signal emitted by the power transceiver.

In an alternate configuration of the present invention, the processor 240 could convert the combined signature waveform from analog form to digital form using converter 270, and store the digital form as the signature. FIG. 1, shows selector 280 which allows the processor 240 to engage or disengage the analog to digital converter. When the consumer device transceiver 400 receives the combined signal, it may not need to perform substantial processing on the combined waveform to determine the signature waveform, because in this embodiment the combined waveform is the signature waveform. The consumer transceiver 400 may use the analog to digital converter 440 to transform the signature into a digital code, which the output 450 would use to query the server. In a modification of this embodiment, the software 460 embedded in the memory 450 of the power transceiver 200 could cause the transceiver 200 to calculate and predict the resultant combined signature waveform rather than or in addition to measuring it directly. As shown in FIG. 3, the transceiver 200 could adjust the signature so that the spectrum of the combined signal takes a particular form that is easier to process or discriminate. In FIG. 3 this adjusted spectrum is shown with irregular, rectangularly-shaped subchannels for the purposes of illustration. In an implementation, the spectra of subchannels would not be particularly rectangular, but would be distinct and may be approximated by a number of independent and/or orthogonal subcarriers, as in OFDM (see [0026] for more details). In the example of FIG. 3, a signature could be dynamically generated so that the spectrum and/or time-domain waveform of the combined signal comprises a specific pattern which may make determining the signature easier or simplify the analog to digital conversion.

FIG. 2C shows the frequency spectrum of a combined power signal 720 (shown in heavy weighting) injected onto the frequency spectrum of a standard power signal 710 (light weighting). More specifically, the heavy weighted line represents the combined frequency spectrum which is the addition of the signature waveform plus the power signal waveform; the frequency spectrum of the signature waveform itself is not shown. In some embodiments, the consumer transceiver 400 may use a band pass filter 470 to restrict (S15) the waveform to those areas where the effect of the injection of the signature onto the power signal is most pronounced. For example, the frequency spectrum of the injected signature waveform has the highest amplitude between 100 Hz and 120 Hz (730). The consumer device transceiver 400 can use the band pass filter 470 to process only this section of the frequency spectrum of the injected signature waveform. Once captured, the consumer device transceiver 400 can utilize a demodulator 430 to recover the discrete signature from the combined power-plus-signature waveform. The demodulator 430 may recover the discrete signature 650 from the combined waveform, by using phase-locked loops, envelope-following, correlation methods, or additional filtering. In other embodiments, the processor 240 at the power transceiver could measure various characteristics of the original power waveform and determine a unique signature from these characteristics. A number of different imperfections in the power generator 110 may cause the generator to create a power signal 710 with imperfections which can be used to identify the source of the power signal (much like a finger print can identify an individual).

Referring back to FIG. 2C, once captured, the consumer receiver 400 may proceed to determine the signature from the combined signal 720 using the demodulation process (S7). In some configurations, the consumer transceiver 400 may convert an analog representation of the signature directly into a digital version using an analog to digital converter 440. However, in most cases the detection of a "discrete signature" which has been modulated and added to the power waveform will be performed by a complementary filtering and demodulation process. The digital version of the signature may be expressed for example as a set of geodetic coordinates, or a randomly or algorithmically generated discrete identifier. The digital signature may be stored in a binary, hexadecimal, or decimal format compatible with the processor 480 of the transceiver 400. Once the demodulator 430 of the consumer device 300 discerns the signature, the consumer device 300 may send an out-of-band communication (S11) to a server 500 to collect additional information about the signature. An out-of-band communication is one which uses telephony, internet, Bluetooth, wifi, or other communications protocols, but it excludes sending information through a power line. Communications that are transmitted through a power line are called in-band communications.

To send an out-of-band communication to a server 500, the consumer device 300 may send the digital or analog signature to the server 500. The consumer device 300 may also send an identifier to the server 500 or another consumer device via out-of-band transmission, or to another consumer device or power transceiver 200 via an in-band transmission. An identifier may be a number or other code used to identify the consumer device 300. This identifier may also be the discrete signature of the consumer device 300, suitably modulated for transmission on the channel currently in use. This identifier may also contain or be associated with additional digital information which is modulated and transmitted in the same fashion.

Encryption may be used to secure the out-of-band communications between the power transceiver 200 and the consumer transceiver and server 500. For example, the server 500 may receive this communication, look-up additional information about the signature in the server's records 520, encrypt the information, and send the encrypted information to the consumer device 300. The server 500 may also send a public key to the consumer device 300. Using the public key, the consumer device 300 may encrypt data before sending it to the server 500. In this embodiment, the private key corresponding to the previous public key would be known only to the server 500, and the server 500 would use this private key to decrypt data which had been encrypted by the consumer device 300 using the public key.

Alternate encryption techniques may be used to secure the transmissions. For example, the consumer device 300 may comprise a public key and a private key in its memory 490. The microprocessor 480 may send the public key to the server 500. The microprocessor 570 of the server 500 can use the public key to encrypt the information before it sends the information to the consumer transceiver 400. The consumer transceiver 400 can receive the encrypted information from the server 500 using server input 460. The microprocessor 480 of the consumer transceiver 400 can use the private key to decrypt the encrypted information and then send (S14) the information to the controller 320. Though these embodiments describe using public, private key encryption techniques, in other configurations, the server 500 could use a different encryption system or not use encryption at all. Moreover, information exchange between the power transceiver 200 and the consumer device 300 may be encrypted as may the exchange of information between the power transceiver 200 and the server 500. Additionally, the public/private key exchange and the resulting encrypted message interchanges may occur using either an out-of-band transmission or an in-band transmission.

Power companies may also use this technology to track and measure the usage of power by the consumer devices. When a consumer device 300 receives power it may send a signal in-band, upstream for indicating its identity to the power source or other monitoring entity so that the power source 100 can track the consumer device's 300 energy consumption, location, physical connection, signal propagation path, or other parameters pertaining to electric power consumption and generation. A consumer device's identifier may be stored in memory 490 and/or generated via the processor 480. Should the flow of information back to the power source be interrupted, the interruption may indicate a problem with the consumer device 300, the power signal, or the power lines. Software 150 containing instructions in the memory 140 of the power source 100 may cause the power source 100 to monitor for changes in the consumption of electricity. For example, should a cluster of consumer devices all fail to return their signature at a similar time, the processor 130 of the power source 100 may determine there is a problem with the power generator 110 or with the power lines. By analyzing the location of the consumer devices 300 which have power (i.e. are able to respond with signature transmissions) and those that do not have power (are unable to respond with signature transmissions), the location of the damaged power line can be determined. Moreover, the power source 100 or a collection of several power sources 100 may be able to reroute power to the consumer devices 300 once the processor 130 has determined which lines are malfunctioning. Another embodiment of the present invention, may involve providing instructions in the memory 140 of the power source to monitor fluctuations in a consumer device's or location's usage. A change in the pattern of usage may indicate a potential problem with the consumer device or unauthorized usage. For example, if the consumer device were a computer, and the computer is only powered on between 9-5 PM, and it is turned powered on at 2:00 AM, the power transceiver or other monitoring entity may determine security at the location of the computer may have been compromised. Similarly, by monitoring and/or recording the locations that electric vehicles typically attach to the grid for charging, the power company may adjust its infrastructure to provide additional capacity, or allow for dynamic system reconfiguration to compensate for potential oversubscription situations due to these large, mobile consumer/generator devices. An application of this process would include a database controlled by the power company which keeps track of the physical connection of multiple electric vehicles. This database would logically be contained or implemented in the records 520 and software 560 of server 500. With these records 520 and the in-band, bidirectional transmissions 450 and 460, the server 500 would know, at any point in time, which specific feeders and/or distribution links have (or had) electric vehicles physically attached. Using the technologies described herein, the server 500 and associated software 560 would save in records 520 time-based information about the electric vehicles, the battery in the vehicles, the owner preferences/requirements for charge, and other important parameters related to the grid configuration, power supply and usage, and overall stability of end-to-end electric service being provided or consumed by devices on the grid. The items of information stored in records 520 which pertain to interactions between power sources 100 and consumer devices 300 and which may be used to affect or improve grid stability or efficiency could then be leveraged by software 560 to effect in-band or out-of-band communication to a multiplicity of consumer devices 300 and remotely control or optimize end-to-end grid performance.

OFDM Injection

There are several ways the power transceiver can modulate and inject or embed the signature into the power signal 710. A first way, involves using OFDM injection (orthogonal frequency division multiplexing) which uses several non-overlapping narrow-band channels ("frequency division") to carry several streams of digital data in a parallel fashion 730. FIG. 2C, shows the presence of these non-overlapping narrow band channels 730. The data in each sub-channel is typically modulated and may be individually or jointly protected with error-control coding. In this fashion, channel conditions are compensated through relatively low-rate modulation in each sub-channel, while the aggregate data rate of the sub-carriers is maintained. OFDM leverages multiple independent sub-channels in different frequency bands, each with an independent modulation scheme, to effectively transmit data in a difficult channel environment. Multiple combinations of techniques may be used in embodiments of the present invention, including multiple channels with variable frequency spacing, multiple modulation techniques, and multiple error-control and correction techniques encompassing one or more of the sub-channels.

In one or more sub-channels, the modulator may be instructed to use instantaneous phase discontinuities such as single-carrier phase shift keying (N-PSK), or quadrature-carrier PSK (QPSK), or differential PSK (D-PSK), or a version of minimum-shift keying (MSK) to produce sub-channel modulation or to provide an improved error rate in the power channel without requiring carrier recovery for coherent demodulation. Examples of characteristics of several PSK-based sub-carrier modulation approaches used in embodiments of the present invention are shown in Table 1 below. The table shows the effective bit-rate for a given modulation scheme based on a specific sub-channel bandwidth, for the two cases of 90% and 99% spectral containment. For the use of OFDM in embodiments of the present invention, the bit-rates in the table indicate an approximate throughput per sub-carrier of the signature data plus any bits required for forward error-control coding.

TABLE 1

| Modulation Scheme | 20 Hz BW | | 10 Hz BW | |
|---|---|---|---|---|
| | 90% | 99% | 90% | 99% |
| MSK | 20 bps | 16 bps | 10 bps | 8 bps |
| BPSK | 10 bps | <1 bps | 5 bps | <0.5 bps |
| QPSK | 20 bps | 2.5 bps | 10 bps | ~1 bps |

Table 1 shows spectral containment for three modulation schemes (MSK, BPSK, and QPSK). When a modulator converts discrete data (individual bits or groups of bits) into a continuous waveform (such as an analog signal) the resulting waveform is modified in various ways. The modifications may include, for example, an abrupt change in the waveform to represent the beginning and end of each piece of discrete data. For example, if the modulation scheme is "PSK" (Phase Shift Keying), then the modulator abruptly changes the phase of the analog signal to indicate a bit or symbol transition. The phase of an analog signal generally refers to a shift in the positive or negative x direction of a wave. In modulation for the purpose of communication, the waves (carriers) are sinusoidal functions of time. So, the x direction of the carrier is generally considered to be the time axis, and a phase shift refers to a delay or advancement (in time) of the natural evolution of the sinusoidal carrier. For example, $\sin(t \pm 180°) = -\sin(t)$. Phase modulation is a process similar to frequency modulation, wherein the phase of a carrier wave is modified to embed the desired information. Similarly, if the modulation technique is ASK (Amplitude Shift Keying), the amplitude of the wave is changed to indicate a bit or symbol transition.

The modulated waveform generated by power generator 110, power transceiver 200, or consumer device 300 may have modulation artifacts, which may be abrupt changes in the waveform, a warping of the waveform's shape, or a spurious, localized energy burst in the frequency spectrum. Certain techniques may be employed to improve the spectral containment of these modulation artifacts. Spectral containment refers to the percentage of the modulation artifacts which, when injected alongside the original power signal, do not bleed into one another or otherwise adversely affect the power signal. Some modulation schemes minimize these artifacts, and so have better spectral containment for a given bit-rate or carrier frequency. In some embodiments, the modulator 220 may generate a modulated signal with a higher spectral containment, thereby possibly reducing the effective bits per second of the transmission.

The modulator 220 of the present invention may use MSK (Minimum Shift Keying), BPSK (Binary Phase Shift Keying), or QPSK (Quaternary Phase Shift Keying) to reach a balance between spectral containment and bandwidth of the transmission. As shown Table 1, in a 10 Hz or 20 Hz section of spectrum, maintaining 99% spectral containment (i.e. relatively no leakage), more bits-per-second can be transmitted with MSK than with BPSK or QPSK. If minimizing leakage is less important and 90% containment is sufficient, QPSK and MSK have about the same throughput. Thus, if the modulator 240 uses the MSK algorithm to modulate the signature bits onto a sinusoidal carrier (thereby producing a modulated signature waveform), the spectrum of the resulting signature waveform will be much narrower than if the modulator used BPSK or QPSK to modulate those same signature bits onto the sinusoidal carrier. Similarly, after injection or embedding of the modulated signature waveform into (onto) the original power signal, the "disturbances" created by the presence of the modulated signature waveform might be more predictable or controllable than with modulation algorithms with poorer spectral containment.

As shown in Table 1 and Table 2, lowering the BW (bandwidth) generally decreases the amount of data that can be transmitted in a given amount of time. Table 2 shows the approximate number of bits per second that can be transmitted by several different PSK algorithms in various channel bandwidths (5 Hz, 10 Hz, 20 Hz). The various PSK algorithms in Table 2 use different numbers of possible phase shifts (M) to represent symbol or bit transitions. For example, when M=2 (BPSK) there are two possible phase-states that the carrier waveform can inhabit. A "1" data bit corresponds to a particular phase-state, and a "0" data bit corresponds to the other phase-state. In contrast, when M=8 (8PSK) there are 8 possible phase-states that the carrier waveform(s) can inhabit. Each distinct group of 3 consecutive data bits ("000", "001", "010", etc.) determines which phase-state the carrier waveform inhabits.

Bandwidth is related directly to maximum data throughput because to transmit a number of discrete information bits through a channel using a carrier signal, the modulator 220 has to make modifications to the carrier signal. There are only so many changes that can be made to a carrier signal per unit of time, so the power transceiver 200 can send more information per second by using a wider channel bandwidth, and a higher-frequency carrier. Increasing spectral containment decreases the amount of data that can be transmitted, because the process of increasing spectral containment involves compacting the spectrum of the modulated signal in order to prevent or reduce bleeding onto an adjacent spectrum. Compacting the spectrum is equivalent to requiring a lower channel bandwidth, which reduces the number of physical changes per unit time, which reduces the number of bits that can be used for modulation, which reduces bit rate.

Testing of various PSK modulation techniques have revealed that as frequency and the dimensionality (i.e. the Phase Shift M-property) increase, more data per second can be transmitted, as shown in Table 2.

TABLE 2

| M-ary PSK | BPS for a given channel BW | | | M | bps/Hz |
|---|---|---|---|---|---|
| | 5 Hz | 10 Hz | 20 Hz | | |
| BPSK | 2.5 | 5 | 10 | 2 | 0.5 |
| QPSK | 5 | 10 | 20 | 4 | 1 |
| 8PSK | 7.5 | 15 | 30 | 8 | 1.5 |
| 16PSK | 10 | 20 | 40 | 16 | 2 |

Thus if the modulator 220 is instructed to use binary shift keying at a bandwidth of 5 Hz, 2.5 bits per second can be transferred at a rate of 0.5 bits per Hz. Similarly, if the modulator 220 is instructed to use quadrature carrier phase shift keying a bandwidth of 20 Hz, 20 bits per second can be transferred at a rate of 1 bits per Hz.

Theoretically, if the software 260 of the power transceiver were programmed to send more data bits per change in the carrier waveform, the throughput or bandwidth of the transmission would increase (bits/Hz). However, as M increases the complexity of the algorithm the power transceiver would use would increase, and the possibility the consumer transceiver will make errors in decoding the bits increases. For example, BPSK is very robust to bit errors and the consumer transceiver 300 is less likely to make errors in decoding the transmission, but with 16-PSK a consumer transceiver 300 is more likely to make errors, making 16 PSK less desirable.

When implementing the disclosed system several different parameters may need to be customized or adjusted to compensate for local characteristics of the power signal and physical channel. These parameters may include the number and width of various sub-channels, the power level of the transmissions in each sub-channel, and the requirement for various error-correction schemas in each sub-channel or across the collection of sub-channels. For example, current research has indicated that transmitting the signature on or near the $12^{th}$, $14^{th}$, and $16^{th}$ harmonics utilizing QPSK modulation has provided adequate data throughput (bits/second), low error rate, simple implementation, low distortion of the fundamental, and good spectral containment.

Additionally, in some embodiments it may be helpful to implement a forward error correction coding technique such as Coded OFDM (COFDM). In these embodiments, the modulator 220 may implement Coded OFDM is OFDM with an error-correcting code applied to the data-bits before modulation. The error-correcting code essentially scrambles the original data in a controlled fashion and inserts extra data for purposes of redundancy. This process improves the robustness of the transmission, and provides the consumer transceiver 300 additional techniques for correcting errors after demodulating the signature from the combined signal 720 (FIG. 2C). After the analog waveform is demodulated and the discrete signature data is estimated, some errors may still exist in the estimated data. These errors may be detected and/or corrected when the error-correction algorithm is applied. Parity-check bits on data blocks are an example of simple error-detection codes. Other, more sophisticated error detection/correction codes or algorithms can be applied which allow the detection and/or correction of multiple bit errors in a block or sequence of received bits. Some types of COFDM that may be compatible with the present invention include: OFDM systems which use a convolutional code concatenated with Reed-Solomon encoding and requisite time/frequency interleaving (such as 2:1 or 3:2 convolutional code), and OFDM systems which use turbo codes or low-density parity-checking. Convolutional codes, Reed-Solomon codes, and Turbo codes are specific examples of error detection/correction codes. Moreover, Multiple Access OFDM (OFDMA) may be used by the modulator to provide the modulator with the ability to separate symbols from different users in both time and frequency. "Symbols" are groups of data bits emitted by a specific user or device, which may have had error-correction coding applied before being separated into groups. These groups of bits, or symbols, are used in the modulation process to trigger changes in phase and/or frequency and/or amplitude of the carrier signal(s).

The modulator 220 may modulate the binary signature data using OFDM techniques with one or several sub-channels, or using conventional modulation techniques with one or several sub-channels. In each case, the specific modulation techniques used in each sub-channel may be a combination of techniques as described herein to create a combined power-plus-signature signal.

CDMA

Code-Division Multiple Access (CDMA) may also be used in embodiments of the present invention for coding & modulating the in-band signature. CDMA, also known as "Direct Sequence Spread Spectrum" (DSSS), uses a pseudo-random binary sequence called a Pseudo-Noise code (PN code) or "chip sequence" to discretely modulate the payload data sequence. In this discrete modulation, the data sequence is multiplied by the chip sequence. The PN code has a much shorter bit-period than the bit-period of the data sequence, so the spectrum of the resulting signal is "spread" over a larger frequency range. The "coding gain" of the CDMA process is the ratio of "chip bits" or PN code bits per "data bit". The bandwidth of the resulting "spread spectrum" signal is computed from the effective bandwidth of the original payload signal multiplied by the coding gain.

Binary-PSK (BPSK) may be used as a channel modulation technique for data streams that result from DSSS techniques. An important characteristic of CDMA is the orthogonality of the PN codes that are used to modulate and spread the payload data sequences. The orthogonality of these PN codes allows multiple payload sequences (each with different PN code) to have simultaneous use of a common spectrum ("multiple access") while preserving unique detection ("code division").

The modulator 220 may modulate binary signature data using a PN code with a prescribed spreading gain, such as 16 chips/bit. The modulator may then modulate the resulting digitally spread signal using BPSK with a prescribed carrier frequency (say, 750 Hz) to create a combined power-plus-signature signal. The modulator 220 may need to optimize certain parameters of the modulation process which may include the number and width of various sub-channels, the spreading gain and type of modulation in each sub-channel, the PN codes for spreading, the number of data bits transmitted in each sub-channel, the power level of the signature transmissions, and the requirement for various error-correction schemes in each sub-channel or across multiple sub-channels.

Unique sequences such as PN codes may also be used to determine range or distance of the consumer device 300 from the power transceiver 200 or power supply 100. When a unique PN sequence is injected into a channel at the power transceiver 200, the consumer device 300 may reflect the signal back to the consumer device 300. The unique properties of the PN sequence can be used to estimate channel length via a correlation algorithm. This correlation algorithm can detect time-shifts in similar sequences, and then relate these time-shifts to physical distance.

Channel Length

Figure 4:
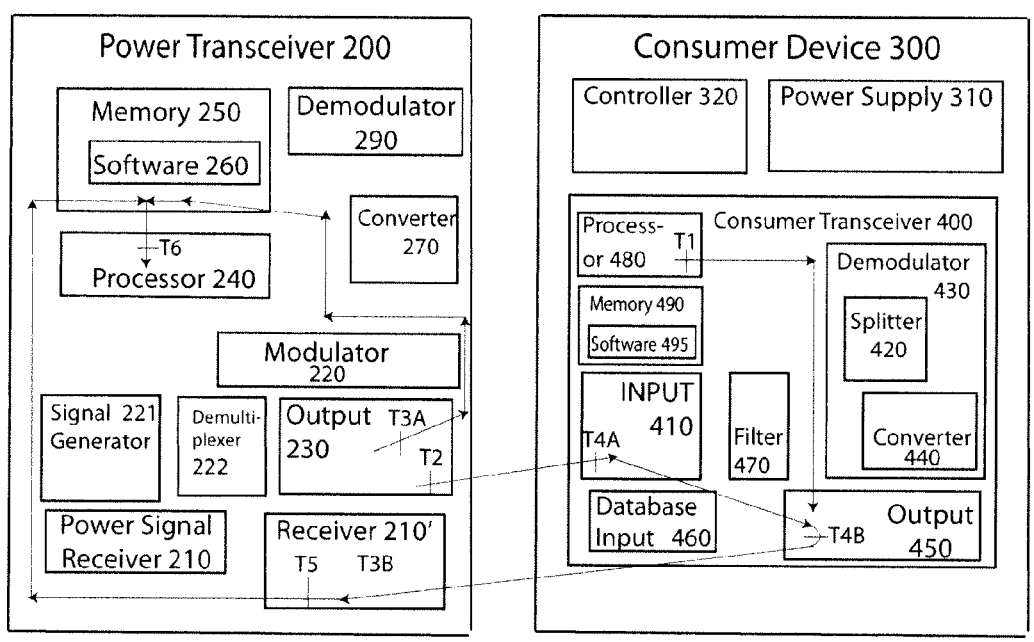
FIG. 4: is a schematic view of an embodiment of the invention illustrating a flow process for determining the distance between the power transceiver and the consumer device.
Figure 5:
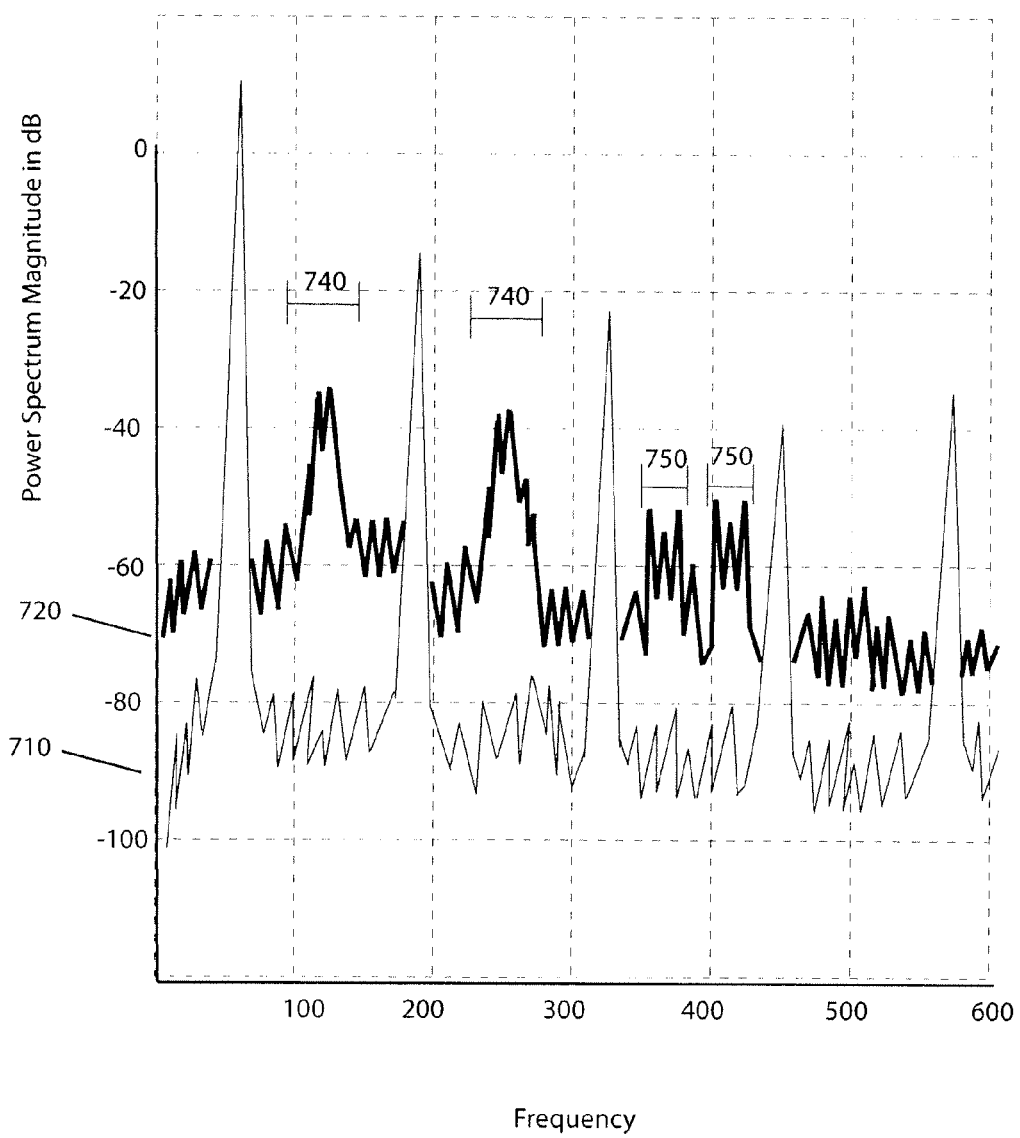
FIG. 5: is a graph of a third embodiment of the frequency content of the power signal and the combined signal emitted by the power transceiver.
Figure 6A:
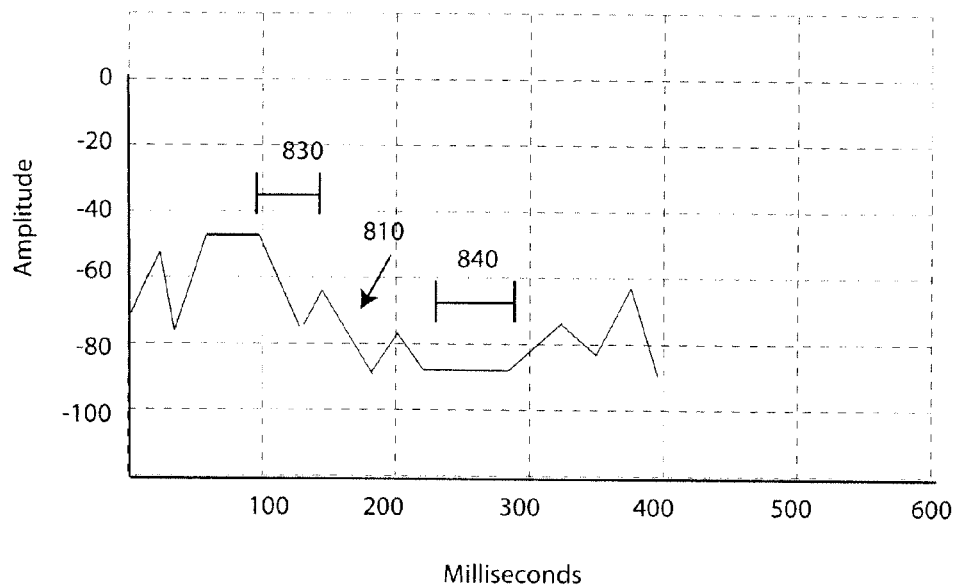
FIG. 6A: is a graph of a transmitted carrier signal.
Figure 6B:
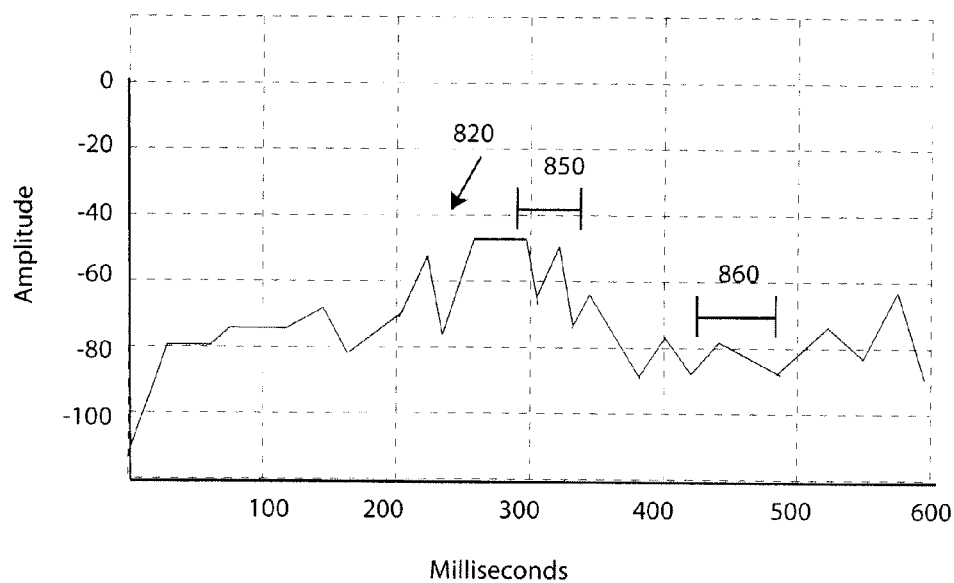
FIG. 6B: is a graph of an echoed carrier signal.
Figure 7A:
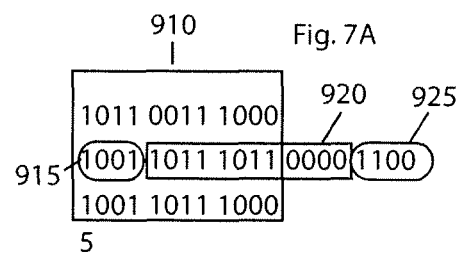
FIGS. 7A-7C: illustrate a process for determining the time shift of an echoed carrier signal.

The system may be configured to measure channel length for diagnostic purposes to optimize or categorize cable deployments, locate singularities, or unique, damaged, or problematic sections of the power line carrying the power signal. To determine channel length, the following processes may be used. It should be noted that some of the steps are optional and many steps can be performed in a differing sequence than the order provided. The following instructions may be stored in the memory of the consumer transceiver and/or the power transceiver. The instructions may take the form of computer executable code that the microprocessor of the respective transceiver can execute. With reference to FIG. 4, in a first step, (T1), the software may instruct the processor 480 of consumer transceiver 400 to instruct the output 450 of the transceiver to echo back any transmissions or signals it receives. Step 2 (T2), the processor may instruct the power transceiver 200 to send a code embedded in a carrier wave "the transmitted signal" to the consumer transceiver 400. Step 3A (T3A), the processor may instruct the power transceiver 200 to save the transmitted signal in memory. Step 3B (T3B), the processor may instruct the power transceiver 200 to start using the receiver 210' to listen for the return signal, and to begin recording transmissions returning to it. Step 4 (T4), the input 410 may receive the transmitted signal from the output 230 of the power transceiver 200, and return (T4B) the signal back to receiver 210' of the power transceiver 200. Step 5 (T5), the processor 240 may cause the power transceiver 300 to save the return signal in the memory 250 of the power transceiver 200. The code from step T3A and T5 may be forwarded to the processor 240, which may analyze the transmitted signal and returned signal to determine the relative time-shift between the signals. The transmitted waveform, or digital version thereof, would not contain any errors, while the returned signal likely will because of interference in the transmission pathway. As a result, the returned signal may be different than the transmitted signal. If the signals were the same, determining the time-shift between the two signals would be straightforward, the processor 240 of the power transceiver 200 would need to shift the returned waveform along the time axis until the returned waveform lined up with the transmitted waveform. The distance of the shift necessary to line up the two waveforms would equal the transmission delay, which can be related to the length of the channel (a similar process could be used when analyzing just the code embedded in the carrier wave). However, since there is interference in most systems, the process to determine time-shift in the real world is more complicated. To deal with interference, the processor 240 would determine the difference between the transmitted and returned waveforms at various points in time. The processor 240 would then select the point in time having the smallest difference as the amount of time-shift between the transmitted and returned signal. For example, FIG. 6A shows a transmitted signal 810 and FIG. 6B a returned signal 820. Notice how interference at 830 and 840 distorted the returned signal 820 at 850 and 860 (in a real system, the inference may affect the entire wavelength.) The power transceiver 200 may already have the code of the transmitted waveform stored in memory (if not, the power transceiver could use the demodulator 290 to discern the code.) As an example, let's assume the code is: 101100111000. The demodulator 290 may also demodulate the return signal, and in this example the demodulated signal may be 1001101110110000. Notice, how the bold faced bits in the return signal differ from the bits of the transmitted signal, which is a result of signal interference. (The bold faced bits are the 1-4, $9^{th}$, and $13^{th}$ bits starting from the left.) The processor 240 of the transceiver 240 may line up the transmitted codes as shown in FIG. 7A. Bounding box 910 shows the section of the received code which will be processed. The bits shown rectangle 920 between the leftmost rounded rectangle and the rightmost rounded rectangle represent the received signal 820. The leftmost rounded rectangle 915 represents random noise detected before the actual signal 820, and the rightmost rounded rectangle 325 represent random noise detected after the actual signal. As the complete signal including noise 315 and 325 is received the processor 240 needs to perform processing on the complete signal in order to separate the signal from the noise.

Figure 7B:
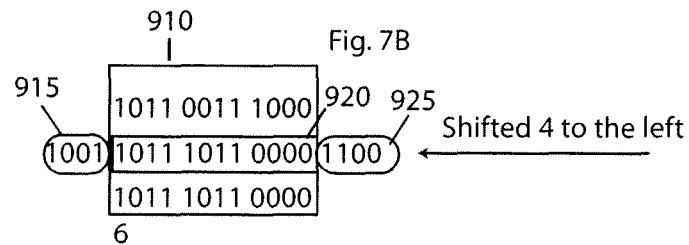
Figure 7C:
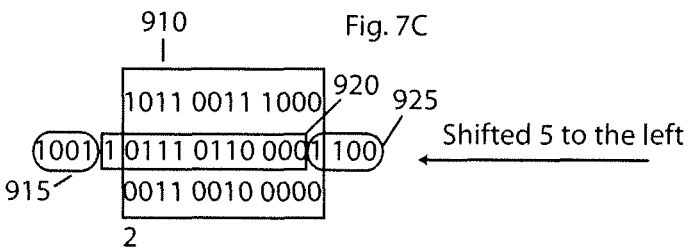

The software 260 in the memory 250 of the processor 240 may instruct the processor 240 to multiply the first transmitted bit by the first return bit, multiply the second transmitted bit by the second return bit, and so on. Then the processor would sum all the product bits, and determine the sum is 5, in this example. If the processor shifts the received transmission one unit of time to left, the sum of the bits of the received code yields a sum of 4. If the processor shifts the received unit again to the left, the calculated sum is 3. If the processor shifts the received unit twice more to the left, we have the example shown in FIG. 7B, which shows a sum of 6 (and a shift of 4). Notice how the interference causes two of the bits (the $5^{th}$ and $9^{th}$ bit) to appear to misaligned. Nonetheless, the highest sum when this process is completed, determined the correct time shift. In many embodiments, the processor 240 would not know it had reached the highest sum until it calculates a number of additional sums after reaching the pinnacle sum. As an example, the processor 240, after shifting the received code to the left again (for a total shift of 5 units to the left) would calculate, the sum is 2, which less than 7 (FIG. 7C). The process may continue until the processor determines that a time shift of 4 yielded the highest sum. From this determination, the processor determines that it took 4 units of time for the transmitted signal to move from the power transceiver, to the consumer transceiver, and back to the power transceiver. Using the formula distance=(½)(speed*time), the approximate distance can be determined by multiplying the time shift by the speed of the signal. (The ½ factor must be included since the time shift yields the time it takes for the signal to travel twice the distance between the power transceiver and receiving transceiver.) The speed of signal could be determined for example by determining the time shift when the distance between the power transceiver and the consumer transceiver is known, or can be taken as the speed of light. Thus, an overall process may involve first determining the speed of the signal or using the speed of light as a constant, and then determining the distance between the transmitting transceiver and a returning transceiver. Moreover, although a process for instructing the power transceiver 200 to determine the distance existing between it and the consumer transceiver 400 is described, a similar process for instructing the consumer transceiver 400 to determine the distance between it and power transceiver 200 could be performed simply be reversing the above process, wherein the consumer transceiver would send the transmitting signal and the power transceiver would send the return signal.

Tracking Consumer Device Consumption

One recognized difficulty with electric or hybrid vehicles (such as cars, motorcycles, boats, RVs, and airplanes) relates to the difficulty with establishing charging stations to recharge their batteries. Prior art solutions have involved pre-authorizing the flow of power from an outlet to charge the vehicle. In such a solution, a user would drive up the charging station, insert a credit card, the charging station would authorize the payment, and turn the outlet "on" for a certain amount of time, allowing the vehicle to draw a certain amount of energy. This technique requires expensive equipment, possible credit card machines, and modification to existing electrical infrastructure. This cost would be a large deterrent for public parking lots, hotels, and other areas where cars are parked. It also would not work at a "neighbor's" house for example, as the neighbor would not likely have the infrastructure necessary to charge for the energy. What is needed is some sort of automated billing system, wherein the person charging his or her vehicle is automatically charged for energy he or she consumes when the vehicle is being charged. Ideally, no configuration would be needed so that a second user could maneuver his or her vehicle to the outlet and also benefit from a simple charging system. Aspects of the present invention provide such a solution.

Figure 8:
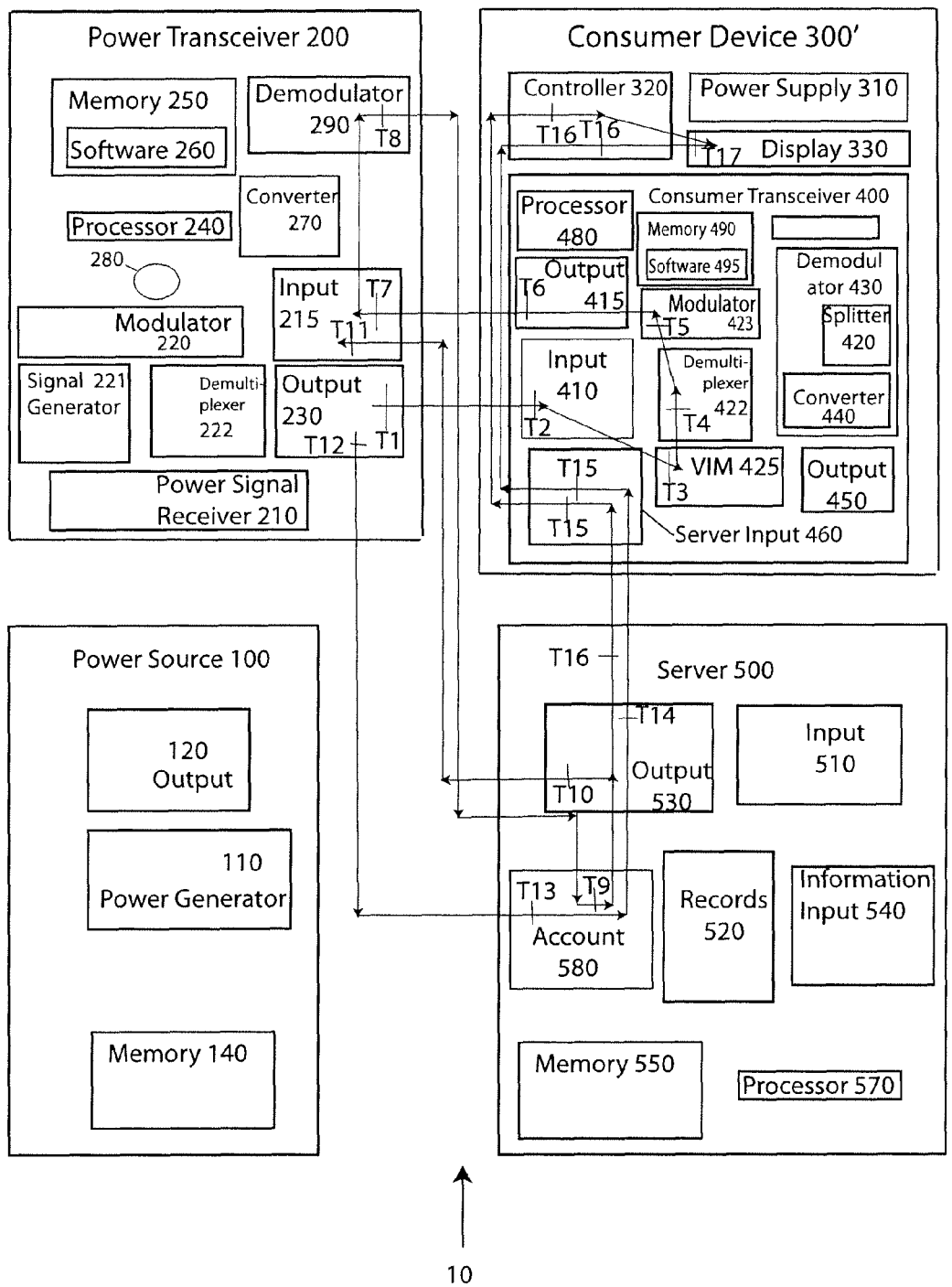
FIG. 8: is a schematic view of an embodiment of the invention which allows a power company to charge or credit a user of power.

With reference FIG. 8, consumer device 300' (which may be a vehicle for example) may have a VIM 425 (vehicle identification module). It should be appreciated that certain internal components (such as the modulator 423 or demultiplexor 422) shown in FIG. 8 can be substituted into FIG. 1, and vice versa. The VIM 425 may be a chip or simply a code stored in memory. The code represents a unique identifier or signature for the vehicle (such as the VIN number).

In one configuration of the invention, a user may have the option to create an account 580 in the memory 550 of the server 500. The account 580 may include a billing address, credit card information, information about the consumer device 300', power draw information, and power transmission information. When the user connects his or her device 300' to the outlet, power flows (T1) to the input 410 of the consumer device 300 from the power source 100'. The input 410 of the device may send the information to the processor 480 of the consumer device 300 may inform the power transceiver 200 that the user's account should be charged for the energy the device 300 will consume. To arrange this, the consumer device 300 will use it's demultiplexor 422 (T4) and modulator 423 (T5) (as described above in [0023]) to add a signature (possibly from the VIM T3) to the power signal. Output 415 will return (T6) the energy to the input power transceiver. In some cases, the electric infrastructure may comprise additional transceivers or listener devices at certain places in the power network in order to retrieve the signature transmissions from the in-band channel(s) and forward them to the power source or to the server. Also, the listener devices may track other things related to power consumption, including specific location (on the wire), time-of-day, and other tendencies. The input 215 may send (T7) the power signal to the processor 240 and demodulator 290, the power transceiver 200 may determine (T8) the identity of the vehicle 300' by discerning the signature from the received power signal. The power transceiver 200 may then query (T9) the server 500 to determine if the vehicle 300' has an account 580. Using its output 530, the server 500 may transmit (T10) a response to the query to the power transceiver 200. If a positive answer is transmitted, the power transceiver 200 may monitor (T11) the usage of the outlet (using the processor 240 and the input 215), and when the user disengages the use of the outlet, the consumer device 300' will no longer be able to transmit its identity. The power transceiver 200 may note the lack of the identity data being transmitted to the power transceiver 200 and may send (T12) the total amount of energy consumed to the server 500, which (using a dollars/watt factor for example) may determine how much to charge the user for the energy. The server 500 may then charge (T13) the user's credit card or otherwise debit the user's account. The server 500 may also transmit (T14) the total cost of the energy (and perhaps how much energy was used) to the server input 460 of the consumer device 300'. The server input may send (T14) this information to the controller 320 which may instruct (T16) the display 330 to display (T17) this information on a LCD screen 330, for example. If the user does not have an account 580 associated with the signature, the server may transmit (T14) a message to the user through the consumer device 300'to cause the controller to instruct (T16) the display to inform (T17) the user that no account 580 has been established. Also, in some embodiments, the server 500 will transmit (T14) the price of the energy to the consumer device 300' once the identity of the consumer device 300 has been determined. It should be appreciated that the above method, while particularly useful for mobile devices like vehicles, could be used by any consumer device having an identifier, wherein the user wants the power company to charge his account for the device's use of the electricity.

Alternatively, rather than charging the user's device for electricity drawn, if the device is one which has a battery or power saving device, the device could send power back to the power source or direct power to a third locations (such as one of the power source's other customers). This feature might be desirable for a power company in periods of high power consumption, or when a damaged power line is prevented from distributing power to a particular location. For example, if the distribution channels to a first location are damaged, the power transceiver 200 could request power from the battery of a hybrid car to send power to the first location. In such a configuration, it is contemplated that the power transceiver 200 may credit the account associated with the battery which is being depleted of energy. More specifically, settings in the account may be configured so that the consumer device 300' will draw power from the power source 100 if the power costs less than A cents/watt and the charge on the battery is less B percent (energy draw settings), and will transmit if the power source 100 will pay more than C cents/watt for the energy and the charge on the battery is greater than D percent. (energy transmission settings).

In conclusion, the above disclosure has provided ways of injecting information in a power signal, and techniques to capture the injected information. Various processes for using the information have been disclosed, which may relate to the type of device receiving the information. Moreover, techniques for determining the distance of a consumer device 300' have been disclosed, as have a specific implementation which relates to mobile consumer devices 300'. Also various ways of encrypting both in-band and out-of-band transmission have been disclosed. Although specific implementations have been set forth above, they are intended to be exemplarily only, and the scope of the invention should be limited only by the meets and bounds of the following claims.

It is claimed:

1. A process for controlling a consumer device based upon information relating to characteristics of a power source; said process comprising the steps of:
 a. receiving a power signal at a power transceiver;
 b. embedding a signature of a power source into the power signal using a modulator to form a combined signal, wherein embedding the signature of the power source comprises demultiplexing a signal from a signal generator into multiple subsequences, and wherein the modulator adds each subsequence to a distinct frequency-based sub-channel of the power signal;

c. transmitting the combined power signal in-band to a consumer device;
d. transmitting the signature and additional information out-of-band to a server having records;
e. storing the signature and the additional information in the records;
f. demodulating the combined signal to determine the signature;
g. sending the power from the power source to a power supply coupled to the consumer device;
h. generating a query based on the signature;
i. sending the query out-of-band from the consumer device to the server to request the server lookup information in the records; and
j. responding to the query by sending the additional information to the consumer device.

2. The process of claim 1 comprising utilizing the signature as a primary key from which to request the additional information.

3. The process of claim 1 comprising turning off the power supply if the information from the server indicates the cost of power exceeds a predefined value.

4. The process of claim 1 comprising setting the consumer device to run in a power saving mode if the information from the server indicates the cost of power exceeds a predefined value.

5. The process of claim 1 comprising turning on the power supply if the information from the server indicates the cost of the power is less than a predefined value.

6. The process of claim 1 comprising sending battery characteristics, user charge/discharge preferences, and vehicle-specific information to the consumer device.

7. The process of claim 1 comprising sending time-of-day restrictions and power cost information.

8. The process of claim 1 comprising monitoring the characteristics of the power source to determine how much of the power comes from green sources, and instructing the controller to switch off or move certain electrical devices into a reduced power level if a certain percentage of the power does not come from green sources.

9. A process for embedding a signature into a power signal using orthogonal frequency division multiplexing comprising the following steps:
a. generating the signature;
b. receiving a power signal having harmonics for transmitting power to a consumer device and for transmitting the signature to the consumer device;
c. demultiplexing the signature into several sub-sequences; and
d. injecting the signature as a mixed signal with the power signal by adding each sub-sequence to a distinct frequency-based sub-channel of the power signal using a modulator;
e. wherein the modulating utilizes orthogonal frequency division multiplexing to embed the information into the carriers near the power signal.

10. The process of claim 9, wherein the power signal comprises locations of peak and nonpeak spectral magnitude; and the step of modulating adds the sub-sequences to the carriers in the location of nonpeak magnitude.

11. The process of claim 9, wherein the modulator is instructed to use instantaneous phase or amplitude discontinuities to produce sub-channel modulation and improve carrier error rate in the power channel.

12. The process of claim 9, wherein the step of modulating may use minimum shift keying, binary phase shift keying, quadrature-carrier phase shift keying, or differential phase shift keying to produce the sub-channel modulation.

13. The process of claim 12, wherein the step of modulating uses frequency modulation to produce the sub-channel modulation.

14. The process of claim 12, wherein the step of modulating uses amplitude shift keying to produce the sub-channel modulation.

15. The process of claim 9, wherein the embedded information has a spectral containment of at least 90%.

16. The process of claim 9, wherein the embedded information may be embedded at a bandwidth of 5 Hz, 10 Hz, or 20 Hz.

17. The process of claim 9, wherein the embedded information can transfer information at 1.0 bits/Hz and 20 bits per second if the modulator is instructed to use quadrature carrier phase shift keying at a bandwidth of 20 Hz.

18. The process of claim 9, wherein the modulator places the sub-channels near the $12^{th}$, $14^{th}$, and $16^{th}$ harmonics of the power signal.

19. The process of claim 9, wherein the modulator utilizes forward error correction coding to provide the signature with error protection.

20. The process of claim 19 wherein the error correction coding is coded orthogonal frequency division multiplexing.

21. A process for tracking a consumer device's power consumption from a power source comprising the steps of:
a. providing a server having a memory for storing an account having a user's payment information and consumer device information;
b. connecting the consumer device to a power outlet to allow power to flow from the power source to the consumer device;
c. sending an in-band transmission to the power source to charge the account associated with the consumer device for the consumption of the power, wherein the step of sending includes generating a signature for identifying the consumer device, demultiplexing the signature into a plurality of subsequences, and modulating the subsequences into the in-band transmission sent to the power source by adding each subsequence to a distinct frequency-based sub-channel;
d. querying the server out-of-band from the power source to determine whether an account associated with the consumer device exists; and
e. sending a response concerning the query to the power source.

22. The process of claim 21, wherein the signature comprises a code, and the code is stored on a vehicle identification module.

23. The process of claim 21, comprising demodulating the in-band transmission to determine the signature at the power source.

24. The process of claim 21 comprising performing the following process if the response indicates an account associated with the consumer device is present: monitoring the flow of the power from the power source to the consumer device.

25. The process of claim 24 comprising the step of detecting when the consumer device ceases drawing power.

26. The process of claim 24 comprising the step of sending a total amount of energy consumed to the server.

27. The process of claim 24 comprising the step of determining how much to charge the account for the energy consumed.

28. The process of claim 27 comprising the step of transmitting the total charge for the energy and a total amount energy which was consumed by the consumer device.

29. The process of claim 28 comprising the step of displaying the total charge and energy consumed with a component of the consumer device.

30. The process of claim 21 comprising the step of performing the following process if the response does not indicate an account associated with the consumer device is present: transmitting a message to the consumer device to cause the consumer device to display information to indicate that the consumer device is not associated with an account.

31. The process of claim 21 comprising the step of transmitting a price for the energy to the consumer device after the identity of the consumer device has been determined.

32. The process of claim 21 wherein the consumer device is a vehicle.

33. The process of claim 21 wherein the consumer device is an electric or hybrid automobile.

* * * * *